Figure 1:
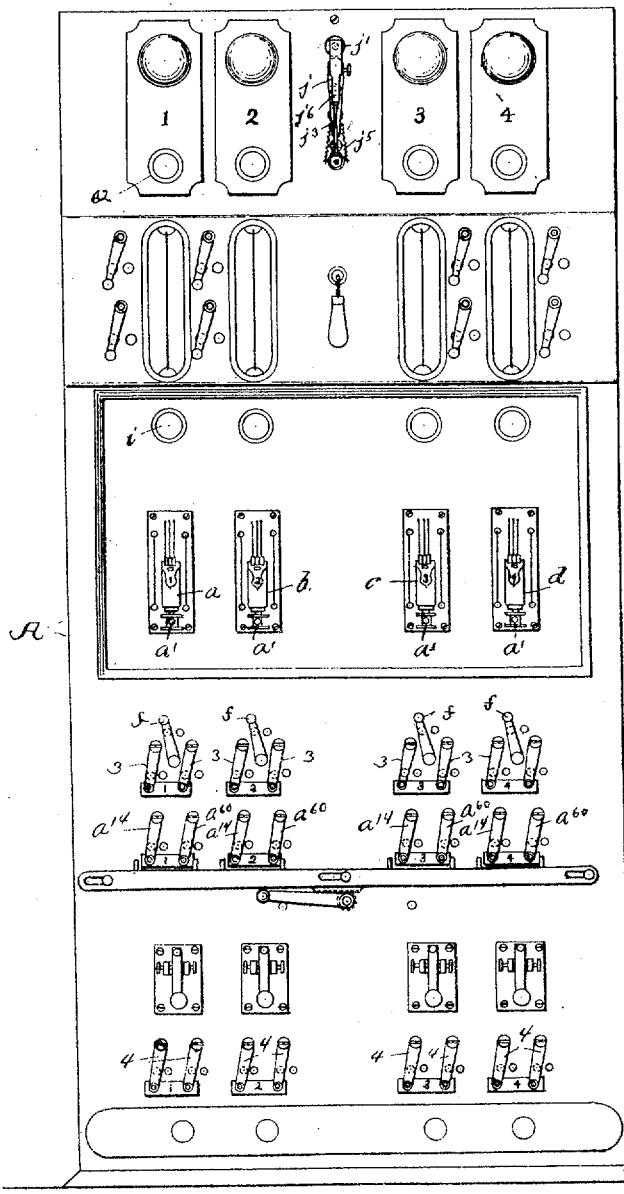

N. H. SUREN.
FIRE ALARM TELEGRAPH APPARATUS.
APPLICATION FILED APR. 12, 1909.

989,516.

Patented Apr. 11, 1911.

7 SHEETS—SHEET 1.

Witnesses:
H. B. Davis.
Cynthia Doyle

Inventor:
Nathan H. Suren
by Hayes & Harriman
attys.

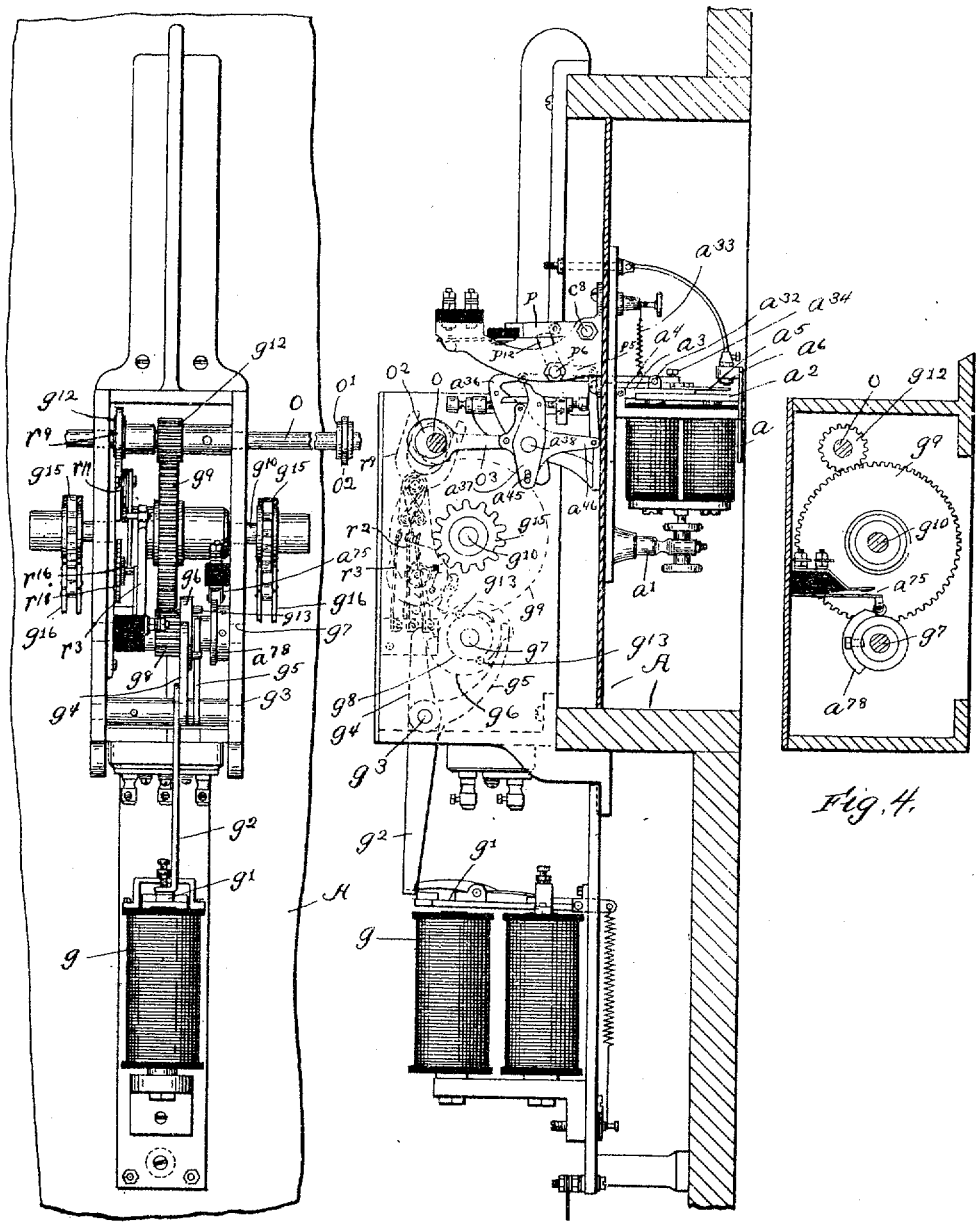

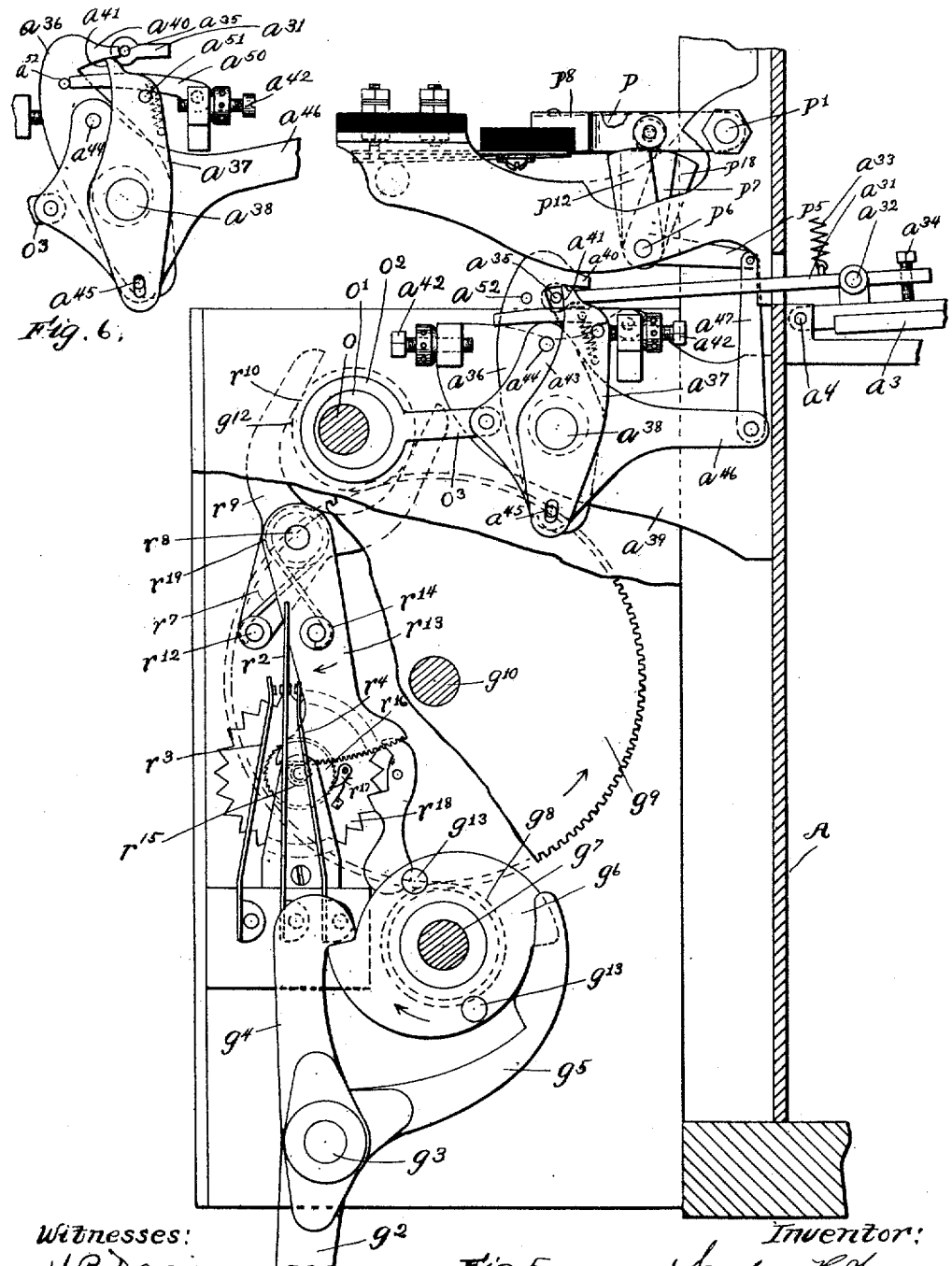

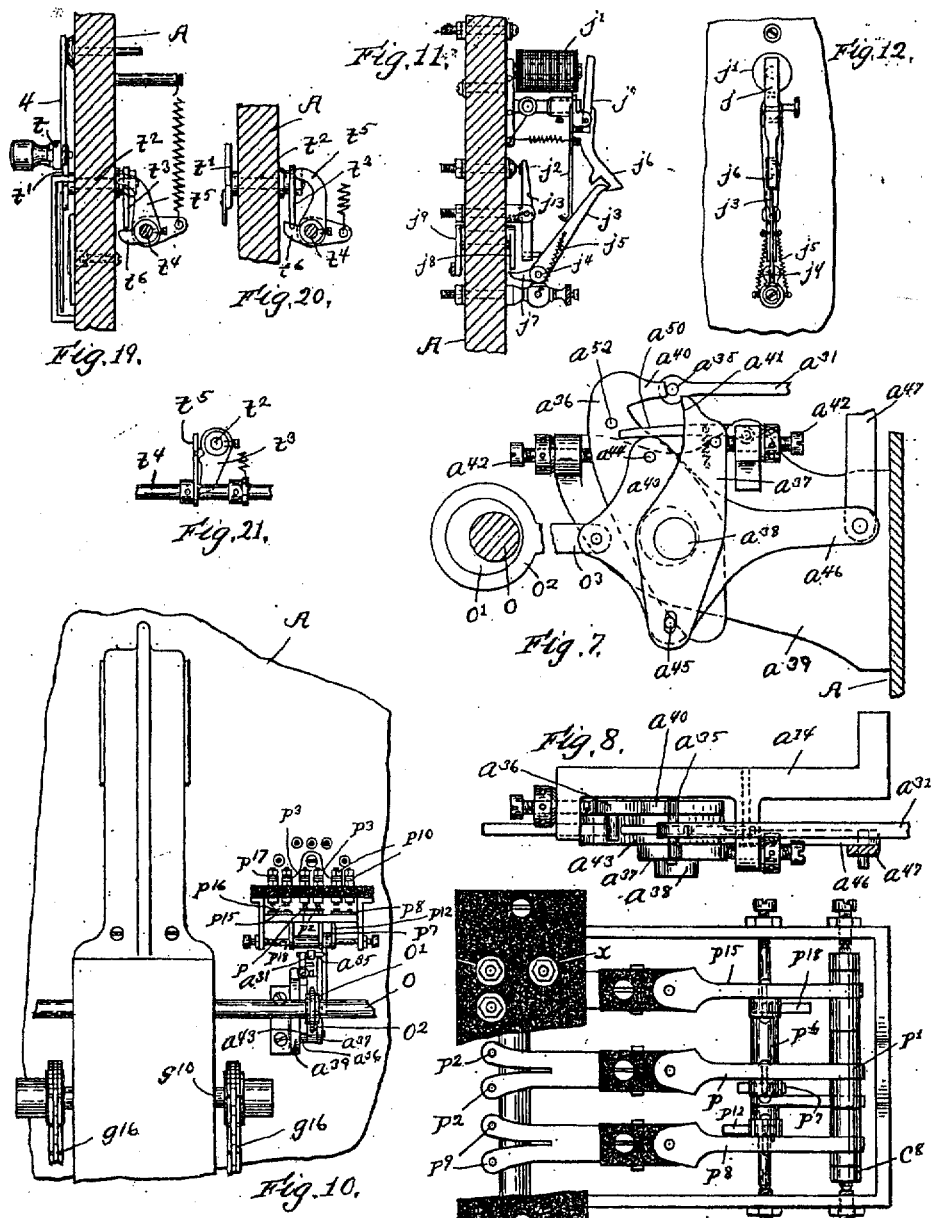

N. H. SUREN.
FIRE ALARM TELEGRAPH APPARATUS.
APPLICATION FILED APR. 12, 1909.
989,516.
Patented Apr. 11, 1911.
7 SHEETS—SHEET 5.
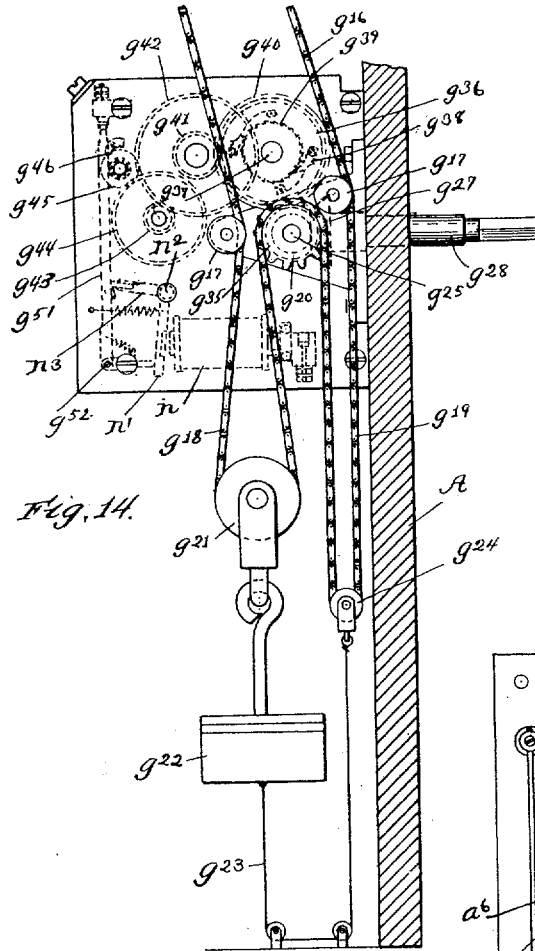
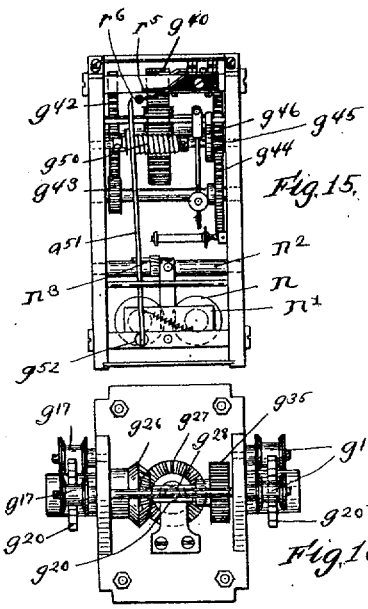
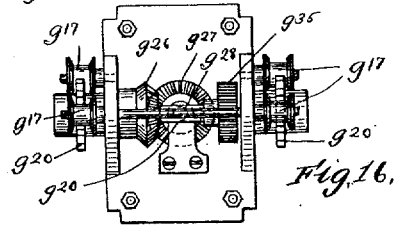
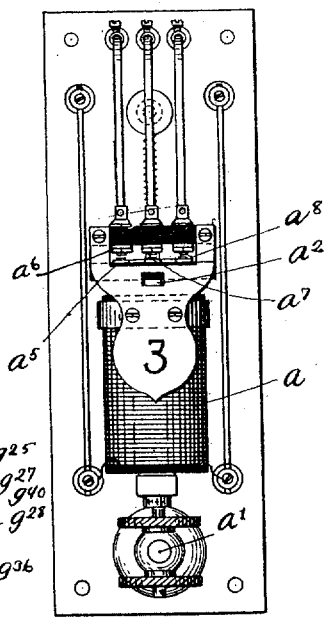
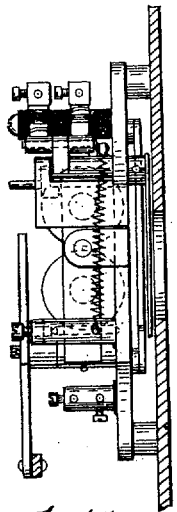
Witnesses:
H. B. Davis.
Cynthia Doyle.
Inventor:
Nathan H. Suren
by Noyes & Harriman
attys.

N. H. SUREN.
FIRE ALARM TELEGRAPH APPARATUS.
APPLICATION FILED APR. 12, 1909.

989,516.

Patented Apr. 11, 1911.

7 SHEETS—SHEET 6.

Witnesses:
H. B. Davis.
Cynthia Doyle

Inventor:
Nathan H. Suren
by Noyes & Harriman
Atty.

N. H. SUREN.
FIRE ALARM TELEGRAPH APPARATUS.
APPLICATION FILED APR. 12, 1909.

989,516.

Patented Apr. 11, 1911.

7 SHEETS—SHEET 7.

Witnesses:
H. B. Davis.
Cynthia Doyle.

Inventor:
Nathan H. Suren
by Noyes & Harriman
attys.

UNITED STATES PATENT OFFICE.

NATHAN H. SUREN, OF NEEDHAM, MASSACHUSETTS, ASSIGNOR TO THE GAMEWELL FIRE-ALARM TELEGRAPH COMPANY, OF NEW YORK, N. Y., A CORPORATION OF NEW YORK.

FIRE-ALARM TELEGRAPH APPARATUS.

989,516.      Specification of Letters Patent.     Patented Apr. 11, 1911.

Application filed April 12, 1909. Serial No. 489,447.

*To all whom it may concern:*

Be it known that I, NATHAN H. SUREN, of Needham, county of Norfolk, State of Massachusetts, have invented an Improvement in Fire-Alarm Telegraph Apparatus, of which the following is a specification.

This invention relates to improvements in fire-alarm telegraph-apparatus, and particularly to a system including an improved central-station signal-receiving and repeating apparatus. At the central-station a plurality of main-relays are arranged, which are connected with several main circuits, said relays being adapted to operate a repeating-circuit, common to all the relays, which contains a repeating-transmitter, adapted to repeat the signals to the engine-houses and elsewhere, and non-interfering-mechanism is employed whereby the repeating-circuit is placed exclusively under the control of any one of the main relays.

One of the objects of this invention is to improve the construction of the non-interference-mechanism to the end that the armatures of all the main relays are at all times free to respond to changes in the condition of the main circuits in which said relays are connected, whereby the repeating-circuit may be operated by the armature of the active-relay, and other functions may be performed by said armature and also by the armatures of all the other relays; that the controlling-switches for the repeating-circuit, all of which are adapted to be controlled by any one of the several main relays, may be normally closed, and means provided, adapted to be operated by any one of the main relays, for locking the switch controlled by the active-relay in normal position and for moving the switches controlled by all the other relays into abnormal position, thereby placing the repeating-circuit exclusively under the control of the active-relay; that automatic means may be provided for subsequently releasing the controlling-switch of the active-relay and for restoring all the other controlling-switches after a signal has been received, or more particularly when the condition of all the main circuits has remained normal for a predetermined period of time.

Recording-circuits are provided whereby the signals from all the main circuits are recorded; and the invention has for its object to provide means whereby said recording-circuits are operated by the main relays, thereby obviating the necessity of providing additional relays for the purpose of accomplishing this result. Constructing the non-interference-mechanism so that the armatures of all the main relays are permitted to move freely at all times permits the accomplishment of this result, for, although but one of the main relays can operate the repeating-circuit yet all the relays can operate their recording-circuits. This is of particular importance in the case of interference as it enables not only the signal which is being received and repeated, to be recorded, but also the signal or signals which may be transmitted while the aforesaid signal is being received, repeated, and recorded, to be received and recorded at the central-station, and not lost. Subsequently such signal or signals may be transmitted to the engine-houses and elsewhere by manual means provided for the purpose.

The invention also has for its object to provide two annunciator-circuits containing annunciators, and to so construct and arrange said circuits and the controlling and operating-devices therefor, that one of said circuits will be operated by the active-relay which is operating to receive and repeat the signal, and the other placed under the control of all the inactive-relays, so that in case any one of said inactive relays should become active while the active-relay is operating, said last named annunciator circuit will be operated.

The invention also has for its object to provide means for automatically disabling the repeating-circuit when two or more main relays respond to their first signal-impulses at the same time, although by reason of the armatures of said relays being free to respond at all times, said signals will be recorded.

The invention also has for its object to provide means for disconnecting the automatic repeating-mechanism from any one or all of the main relays, yet permitting the signals to be recorded.

The invention also has for its object to provide means for connecting the repeating-transmitter with the main circuits, either in series with the main relays or exclusive thereof, whereby the signals may be repeated to the engine-houses and elsewhere without employing the automatic repeating-mechanism.

The invention also has for its object to provide a universal recording-instrument, common to all the main relays, adapted to record all the signals.

Figure 22:
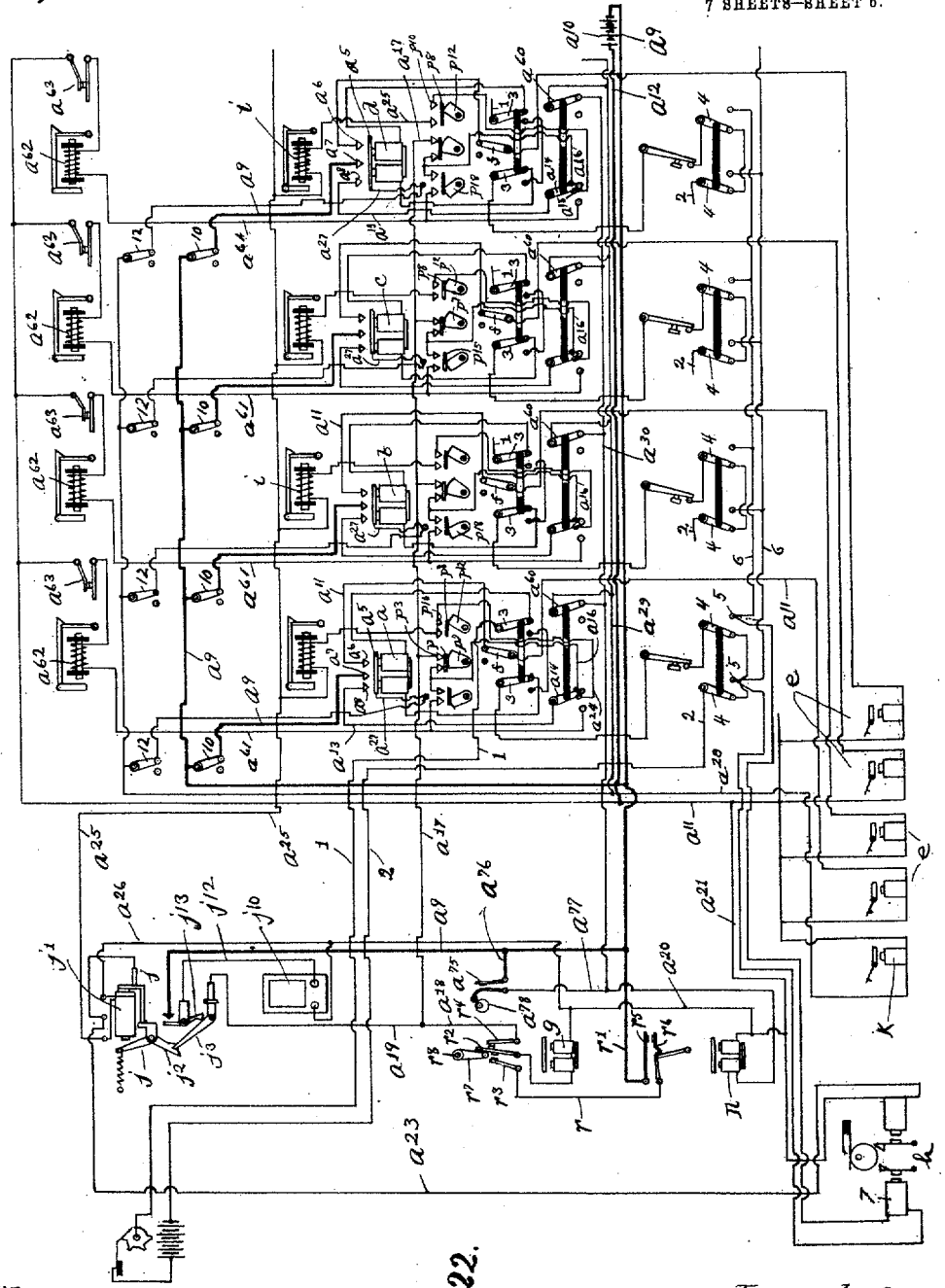
Figure 23:
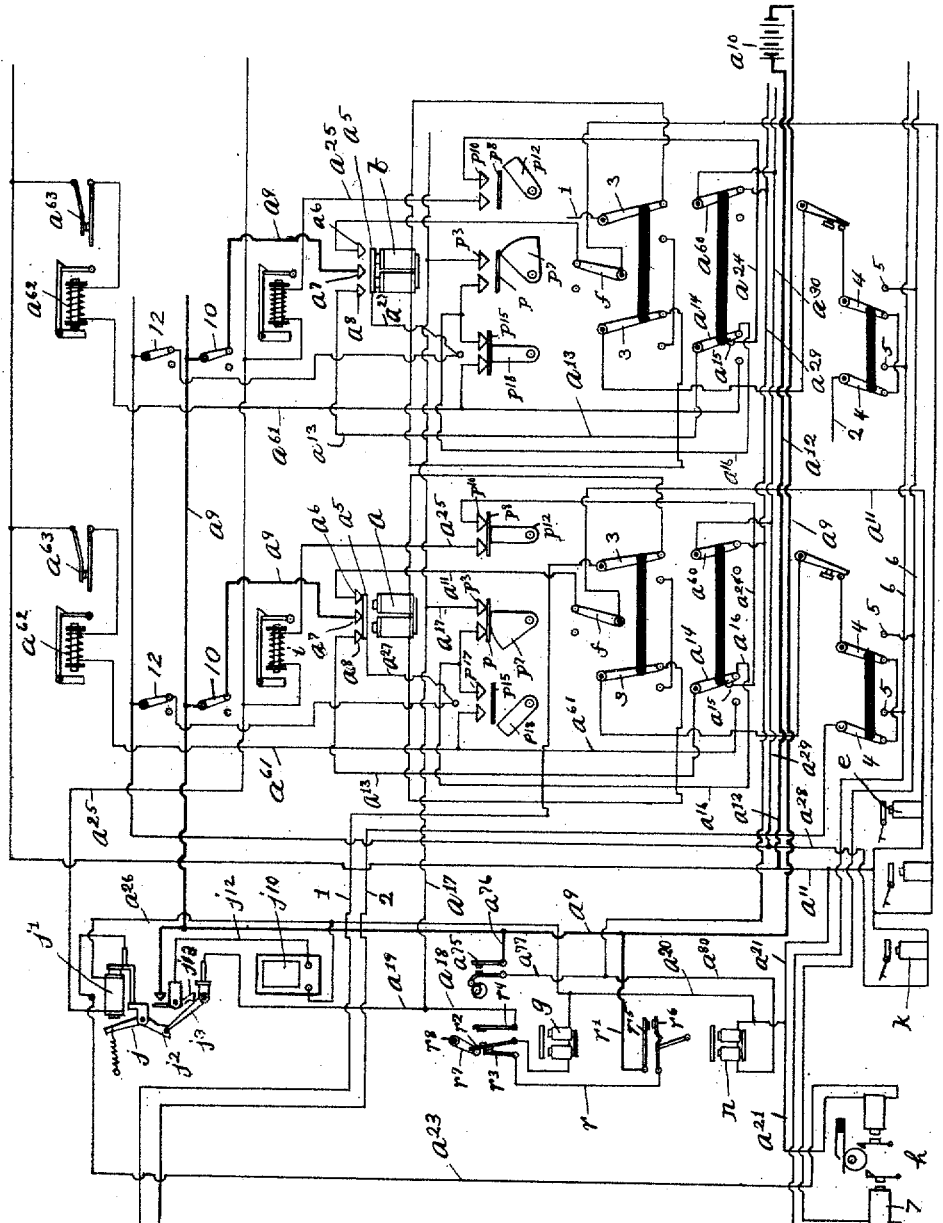

Figure 1 is a front elevation of a switchboard having thereon a central-station signal-receiving and repeating-mechanism embodying this invention. Fig. 2 is an enlarged side view of one of the main-relays, and means operated by it for operating the recording-circuits and repeating-circuit, the controlling-devices for the repeating-circuit, operating-means therefor, actuating-mechanism for said operating-means and tripping-magnet for releasing said actuating-mechanism, the parts being in their normal positions. Fig. 3 is a rear view of the parts shown in Fig. 2. Fig. 4 is a detail of a circuit-operating-device to be referred to. Fig. 5 is an enlarged detail of the controlling-devices for the repeating-circuit, and means for operating them, the parts being in the positions they will occupy in connection with an active relay, when one of the main-relays becomes active upon responding to changes in the condition of its main circuit. Fig. 6 is an enlarged detail of the controlling-devices for the operating-means for the controlling-switches of the repeating-circuit, said devices being in the positions they will occupy in connection with an inactive-relay, when one of the main-relays becomes active. Fig. 7 is a similar enlarged detail showing the parts in their normal positions. Figs. 8 and 9 are details of the controlling-switches for the repeating-circuit. Fig. 10 is a detail showing the controlling-switches for the repeating-circuit and means for operating them. Figs. 11 and 12 are details of a controlling-device for the repeating-circuit, which is adapted to open said circuit when two main-relays respond to their first signal impulses simultaneously. Fig. 13 is a detail of one of the main-relays and circuit-operating devices operated by it. Figs. 14, 15, 16, 17 and 18 are views of the timing-mechanism for controlling the operation of the actuating-mechanism of the controlling-devices for the repeating-circuit. Figs. 19, 20 and 21, are details of an interlocking-hand-switch to be referred to. Fig. 22, is a diagram showing four main-relays connected with four main circuits, the automatic repeating-mechanism, and recording-devices, and other elements, the parts being in their normal positions. Fig. 23, is a similar diagram showing two main-relays only, the parts being in the positions they will occupy when a signal is being received and is being automatically repeated.

The several main circuits containing fire-alarm boxes or other forms of signal-transmitters are connected to a switch-board at a central-station, and each main circuit includes or is adapted to operate a relay, hence there is provided on the switch-board as many relays as there are main circuits connected with the board. Said relays, and the means operated by them, are alike for all the main circuits, so one only need be described in detail.

$a$ represents one of the relay-magnets, and $b$, $c$, and $d$, the others, four being herein shown.

1 and 2 represent the main circuit-wires leading to the relay-magnet $a$. Each circuit-wire includes a hand-switch 3, and said switches are connected together by an insulated bar, and the circuit-wire 2 includes a pair of hand-switches 4, 4, which are also connected together by an insulated bar.

The relay-magnet $a$ is supported by a post $a'$ or other means on one side of the board A. Its armature $a^2$ is borne by a lever $a^3$, pivoted at $a^4$ to a fixed support. Said relay is designed to operate a recording-circuit for operating a recording-instrument which records the signals, and, herein, the armature-lever $a^3$ has arranged on it a contact-plate $a^5$, which is movable by the armature into and out of engagement with stationary contacts $a^6$, $a^7$, which are insulated from each other and provided with means for adapting them to be connected with circuit-wires. The contact $a^7$ is connected by a circuit-wire $a^9$ with a battery $a^{10}$, as for instance, to the positive side thereof, and the contact $a^6$ is connected by a circuit-wire $a^{11}$ with a circuit-wire $a^{12}$ leading to the battery $a^{10}$, as for instance, to the negative side thereof, and said circuit-wire $a^{11}$ includes a recording-instrument $e$, of any suitable construction, and also a hand-switch $f$. When the armature of the relay, which is normally attracted, see Fig. 22, is moved into its retracted position, see Fig. 23, and the contacts $a^6$, $a^7$, engaged by contact-plate $a^5$, the circuit $a^9$, $a^{11}$, $a^{12}$ of the local battery $a^{10}$, including the recorder, is closed, and the recorder operated. Said circuit constitutes the recording-circuit and the contact-plate $a^5$ and contacts $a^6$, $a^7$, the circuit-operating-device therefor. For simplicity of construction, a recording-instrument of the multiple pen variety will preferably be employed, and its pen-magnets included respectively in the several recording-circuits which are operated respectively by the several main-relays, and said pen-magnets, together with the circuit-operating-devices for the recording-circuits, are connected in multiple with the local-battery $a^{10}$. Whenever any one of the main-relays is operated its recording-circuit is operated and the recording-instrument $e$ in turn operated to record the signal, one or another pen-magnet operating according to which recording-circuit is operated. Said main-relay $a$ is also designed to operate a repeating-circuit for operating a repeating-transmitter which is employed to repeat the signals to the engine-houses and elsewhere, and, herein, the contact-plate $a^5$ on the armature-lever is made wide enough to also engage another stationary contact $a^8$, which is arranged at the side of the contact $a^7$, and insulated therefrom, and provided with means adapting it to be connected with a circuit-wire. The contact $a^8$ is connected by a circuit-wire $a^{13}$ with a switch-arm $a^{14}$, normally resting on a split-contact $a^{15}$, one portion of which is connected by a circuit-wire $a^{16}$ with a controlling-switch, to be described, from which a circuit-wire $a^{17}$ leads to two branch-wires $a^{18}$, $a^{19}$. The branch-wire $a^{19}$ is connected with the battery-wire $a^{12}$ by circuit-wires $a^{23}$, $a^{21}$, $a^{11}$, and includes the repeating-transmitter $h$, and also the circuit-breaker of a controlling-device $j$, to be described. When the armature of the main relay is retracted and the contacts $a^7$, $a^8$, engaged by the contact-plate $a^5$, a circuit $a^9$, $a^{13}$, $a^{14}$, $a^{15}$, $a^{16}$, $a^{17}$, $a^{19}$, $a^{23}$, $a^{21}$, $a^{11}$, $a^{12}$, of the local-battery $a^{10}$, including the repeating-transmitter $h$, is closed, and said transmitter operated. Said circuit constitutes the repeating-circuit, and the contact-plate $a^5$ and contacts $a^7$, $a^8$, the circuit-operating-device therefor. Said main relay $a$ is also designed to operate one or the other of two annunciator-circuits, one including the annunciator $i$, when the relay $a$ is the active-relay, and the other including the annunciator $a^{62}$, when the relay $a$ is one of the inactive-relays.

Referring first to the annunciator circuit including the annunciator $i$, the other portion of the split-contact $a^{15}$ is connected by a circuit-wire $a^{24}$ with another controlling-switch, to be described, from which a circuit-wire $a^{25}$, including the annunciator $i$, leads to the operating-magnet of the controlling-device $j$, to be described, and a circuit-wire $a^{26}$ leads from said magnet to the battery-wire $a^{12}$, by circuit-wires $a^{20}$, $a^{21}$, $a^{11}$. When the armature of the main relay is retracted and the contacts $a^7$, $a^8$, engaged by the contact-plate $a^5$, a circuit $a^9$, $a^{13}$, $a^{14}$, $a^{15}$, $a^{24}$, $a^{25}$, $a^{26}$, $a^{20}$, $a^{21}$, $a^{11}$, $a^{12}$, of the local-battery $a^{10}$, including the annunciator $i$, and operating-magnet of controlling-device $j$ is closed, provided the controlling-switch in said circuit is closed, and said annunciator is operated, and said controlling-device placed in condition for operation or is operated, as will be described. Said circuit constitutes the annunciator-circuit for the active-relay, and the contact-plate $a^5$ and contacts $a^7$, $a^8$, the circuit-operating-device therefor. The circuit-wire $a^{16}$ is connected with another controlling-switch, to be described, from which a circuit-wire $a^{61}$, including the annunciator $a^{62}$, leads to the circuit-wire $a^{11}$, and when the armature of the main relay is retracted and the contacts $a^7$, $a^8$, engaged by the contact-plate $a^5$, the circuit $a^9$, $a^{13}$, $a^{14}$, $a^{16}$, $a^{61}$, $a^{11}$, $a^{12}$ of the local battery $a^{10}$, including the annunciator $a^{62}$, is closed, providing the controlling-switch in said circuit is at such time closed, and as a result said annunciator $a^{62}$ is operated. Said circuit constitutes an annunciator-circuit for the inactive-relays, and the contact-plate $a^5$ and contacts $a^7$, $a^8$, the circuit-operating-device therefor.

For simplicity of construction the repeating-circuit is connected with the local-battery $a^{10}$, and it has a plurality of circuit-operating-devices, arranged in multiple, one for each main-relay, and said annunciator-circuits are also connected with said local-battery, and are adapted to be operated by the same circuit-operating devices which are employed to operate the repeating-circuit, but all said circuits are controlled by the controlling-switches to be described.

In addition to the recording-instrument $e$ it is preferred to employ a universal recording-instrument $k$ adapted to be operated to record all signals from all the main-circuits, and, herein, said recording-instrument $k$ is arranged to respond to all movements of the armatures of all the main-relays, and, referring to the relay $a$, a circuit-wire $a^{27}$ leads from the contact-plate $a^5$ to two branch circuit-wires $a^{28}$, $a^{29}$, both of which lead to the battery-wire $a^{12}$, the branch-wire $a^{28}$ including the universal recording-instrument $k$, and leading to the battery-wire $a^{12}$ by circuit-wire $a^{11}$. Whenever the armature of the main-relay is retracted and the contact $a^7$ engaged by the contact-plate $a^5$, the circuit $a^9$, $a^{27}$, $a^{28}$, $a^{11}$, $a^{12}$ of the local-battery $a^{10}$ will be closed, including the universal-recorder $k$. The contact $a^7$ and contact-plate $a^5$ serve as the circuit-operating-device for said circuit. Said circuit-operating-device, as well as the corresponding circuit-operating-devices of the other relays, are connected in multiple, so that whenever any one of the main-relays is operated the universal-recorder will be operated.

When any one of the main-relays is operating, and is in turn operating its recording-instrument $e$ and the repeating-circuit, should another main-relay begin to operate, there would be an interference of the signals unless means were provided for preventing it. In the art of automatic fire-alarm repeaters means have been provided for preventing interference of the signals under similar conditions, by locking out all the inactive relays whenever one of the relays becomes active, locking-devices being usually employed adapted to engage the armatures of the inactive-relays. Herein it is designed to allow armatures of all the relays freedom of motion at all times, even though two or more relays are active at the same time, in order that the recording-instrument $e$ may be operated by them and all the signals recorded, regardless of interference, and also to provide means for controlling the operation of the repeating-circuit, so that notwithstanding the circuit-operating-devices of the repeating-circuit are operated by the relays only those signals which do not interfere are permitted to effect the operation of the repeating-transmitter. To accomplish these results the repeating-circuit is provided with a plurality of controlling-switches by which its operation is controlled, there being one controlling-switch under the control of each main-relay, and said controlling-switches are arranged in multiple, and each controlling-switch is arranged in series with one of the circuit-operating-devices for the repeating-circuit, and although said controlling-switches are under the control of the armatures of the main-relay, yet said armatures are all movable independently of the means operated by them for controlling said switches, so that whether a relay is active or inactive its armature is free to respond. Such provision enables the repeating-transmitter to be placed exclusively under the control of any one of the main-relays, so that but one signal will be repeated, yet permits all the main-relays to be at all times under the control of the main circuits which operate them, so that they are freely responsive to changes in the condition of said main-circuits in order that they may operate their recording-circuits.

Referring to the main-relay $a$, the controlling-switch for the repeating-circuit is included between the circuit-wires $a^{16}$, $a^{17}$, of said circuit, and the other controlling-switches are correspondingly arranged with respect to the other relays. Said controlling-switch is normally closed, as are all the controlling-switches, so that the repeating-circuit is normally in operative condition upon the operation of any one of the main-relays, but means are provided whereby upon the operation of any one of the main-relays the controlling-switches of all the inactive-relays will be immediately opened, thereby preventing the circuit-operating-devices for the repeating-circuit of all the inactive-relays from operating said circuit to operate the repeating-transmitter. The controlling-switch of the active-relay, however, remains closed, and the circuit-operating-device for the repeating-circuit, which is operated by said active-relay, operates said circuit and causes the repeating-transmitter to operate.

$p$ represents the operating-lever of one of the controlling-switches, see Figs. 5 and 9. It is pivoted at $p'$ and at its outer end bears contacts $p^2$ adapted to engage and disengage stationary contacts $p^3$. The position of said lever is controlled by means controlled by the main-relay upon the occurrence of the first impulse of a signal.

$a^{31}$ represents a movable-member which is arranged in conjunction with the armature-lever $a^3$, and is here shown as arranged on said armature-lever and pivoted thereto at $a^{32}$. As said member is movably connected with the armature-lever said armature-lever may be moved independently of it when said member is restrained from movement. Said movable-member is made as a bar which extends through a hole in the board A. It is held in its normal position of rest by a spring $a^{33}$ attached to it which acts to lift the end which projects through the board, but such movement is limited by an adjustable stop $a^{34}$ arranged on said member which engages the armature-lever. Said member is movable on its pivot against the action of said spring $a^{33}$. Said member has at its extremity a pin $a^{35}$ extended through it, which projects laterally from it in opposite ways, adapted to coöperate with two controlling-detents. $a^{36}$ represents one of said detents and $a^{37}$ the other.

The detent $a^{36}$ consists of a flat plate mounted on a pivot-stud $a^{38}$ projecting from a fixed bracket $a^{39}$, and it has at its upper end a nose $a^{40}$ which is arranged to normally engage the side of the pin $a^{35}$. The detent $a^{37}$ consists of a flat plate also mounted on said pivot-stud $a^{38}$, and it has at its upper end a nose $a^{41}$, which normally terminates below and at one side of the pin $a^{35}$. When the armature of the main-relay is in its normal attracted position the pin $a^{35}$ engages and holds the detent $a^{36}$, the detent $a^{37}$ at such time being unrestrained, see Fig. 7, and when said relay becomes active and its armature is moved into its retracted position the pin $a^{35}$ disengages the detent $a^{36}$ and moves down along one side of the nose of the detent $a^{37}$ and holds said detent $a^{37}$, the detent $a^{36}$ at such time being unrestrained. Said detents $a^{36}$ and $a^{37}$ normally rest against adjustable stops $a^{42}$. The operating-member by which the position of the switch-lever $p$ is controlled is arranged to be controlled by said detents, although said detents have other functions in coöperation with the movable-member $a^{31}$. Said operating-member, as here shown consists of a flat plate $a^{43}$ arranged between the detents $a^{36}$, $a^{37}$, and having a large center-hole through it permitting it to occupy a position on the pivot-stud $a^{38}$, without engaging said stud, in order that it may be moved bodily with respect thereto, and said plate is pivotally connected with both of said detents $a^{36}$, $a^{37}$, in such manner that the restrained detent controls its movement.

$a^{44}$ represents a pivot-pin connecting the upper end of the operating-member with the detent $a^{36}$, and $a^{45}$ represents a pivot-pin connecting the lower end of the operating-member with the detent $a^{37}$.

The operating-member is designed to be moved during the first half revolution of a shaft $o$, and to be returned to normal during the last half revolution of said shaft, and, as here shown, said shaft has arranged on it an eccentric $o'$, which is engaged by a strap $o^2$, arranged at one end of a rod $o^3$, the opposite end of said rod being loosely connected to the operating-member. As the rod $o^3$ is moved toward the right, see Fig. 5, by the shaft $o$ the operating-member is moved, but its direction of movement is determined by the position of the detents $a^{36}$, $a^{37}$, as follows:—When the detent $a^{37}$ is restrained, as for instance, by the pin $a^{35}$, occupying a position at one side of it, due to the retraction of the armature of the main-relay, the pivot $a^{45}$ of the operating-member becomes fixed, and the operating-member is moved on said pivot and acts to move the detent $a^{36}$ on its pivot $a^{38}$, so that its nose $a^{40}$ extends over the pin $a^{35}$, and locks the movable-member $a^{31}$ in its depressed position, and when the detent $a^{36}$ is restrained, as for instance, by the pin $a^{35}$ engaging it, due to the armature of the main-relay remaining in its attracted position, the pivot $a^{44}$ of the operating-member becomes fixed and said operating-member is moved on said pivot $a^{44}$ and acts to move the detent $a^{37}$ on its pivot $a^{38}$, so that its nose passes beneath and moves to a position at the other side of said pin $a^{35}$, see Fig. 6. When the rod $o^3$ is moved toward the left during the last half revolution of the shaft $o$ the operating-member is restored to normal, see Fig. 7, and either controlling-detent $a^{36}$ or $a^{37}$ that has been moved by it will be restored to normal. The operating-member is thus rocked but the direction of its rocking motion is controlled by said detents.

The operating-member has an arm $a^{46}$, extended from it, to the extremity of which the lower end of a link $a^{47}$ is connected, the upper end of said link being connected to an arm $p^5$, secured to a rock-shaft $p^6$, bearing a cam $p^7$, which extends radially from it into position to engage or disengage the switch-lever $p$, according as the shaft $p^6$ is rocked in one or the other direction. When in engagement with said lever the latter is raised to close the repeating-circuit, and, it will be understood, that this is the normal position of the switch, and when disengaged therefrom said lever is permitted to fall to open the repeating-circuit at such point.

When the armature of the active-relay first retracts the movable member borne by it is depressed, and disengages the controlling-detent $a^{36}$, see Fig. 5, and its pin $a^{35}$ moves to a position at the side of and acts to lock the controlling-detent $a^{37}$ in its normal position, and as the operating-member is moved the detent $a^{36}$ is moved so that its nose extends over and locks the pin $a^{35}$, and the shaft $p^6$ is rocked and the cam $p^7$ moved by it, but said cam is made wide enough to still remain in engagement with the switch-lever during such movement, so that said controlling-switch remains closed. The armatures of all the inactive-relays at such time remain in their attracted positions, and the movable-members borne by them remain in engagement with the controlling-detents $a^{36}$, and hence the operating-members for all the other controlling-switches will be moved in the opposite way, see Fig. 6, and the detents $a^{37}$ moved to the other side of the pins $a^{35}$, and the shafts $p^6$ accordingly rocked and the cams $p^7$ moved to disengage the switch-levers and permit them to fall and thereby open the repeating-circuit at such points. The repeating-transmitter is thus placed under the exclusive control of the active-relay when the member $a^{31}$ is depressed upon the occurrence of the first impulse of the signal of the active-relay.

The means provided for moving the operating-member is constructed and arranged to hold said member in its abnormal position while the signal is being received and to subsequently restore it to normal and the parts connected with it. Therefore, while a signal is being received the movable-member of the active-relay occupies its abnormal position and is positively held in such position by the controlling-detent $a^{36}$, but as said member is pivotally connected to the armature it will be seen that even while locked the armature is free to vibrate to operate the circuit-operating-devices for the recording-circuit and the repeating-circuit.

When the operating-members of all the inactive-relays have operated to open the controlling-switches of the repeating-circuit and have moved the detents $a^{37}$ to the opposite sides of the pins $a^{35}$, it will be observed that the armatures of all said inactive-relays are also free to vibrate to respond to incoming signals, and when any one of said armatures is so moved the movable-member borne by it is also free to be moved, but in such case while the circuit-operating-devices for the recording-circuit and repeating-circuit are both operated to close said circuits at such points, the recording-circuit only will be operated.

In case a signal comes in on any one of the inactive-relays and the movable-member borne by the armature-lever is depressed by the retracting armature, it is desirable to provide against the controlling-detent $a^{36}$ moving when the pin $a^{35}$ disengages it, and, herein, an arm $a^{50}$ is pivotally connected to the frame near the upper end of the detent $a^{37}$ which rests on a pin $a^{51}$ extended laterally from said detent $a^{37}$ and which is lifted by a movement of said detent $a^{37}$ into its abnormal position, and said arm is arranged so that when thus lifted it will occupy a position opposite a pin $a^{52}$ on the detent $a^{36}$.

The actuating-mechanism which is herein provided for intermittingly rotating the shaft $o$ is constructed and arranged to be operated by power and to be released by a tripping-magnet $g$ upon the occurrence of the first impulse of a signal. As said shaft $o$ is adapted to operate the operating-means for all the controlling-switches for the repeating-circuit, but one actuating-mechanism is required for said shaft and consequently but one tripping-magnet $g$ is employed, but the circuit of said magnet is arranged to be operated by all the main-relays. Said magnet is included in the branch circuit-wire $a^{18}$ and the circuit of said magnet is as follows:—$a^9$, $a^{13}$, $a^{14}$, $a^{15}$, $a^{16}$, $a^{17}$, $a^{18}$, $a^{20}$, $a^{21}$, $a^{11}$, $a^{12}$, and said circuit is operated by the armature of the main-relay, and the corresponding circuits by the armatures of the other main-relays.

The armature $g'$ of the tripping-magnet, see Figs. 2 and 5, bears a detent which is engaged by an arm $g^2$ pivoted at $g^3$, and two detents $g^4$, $g^5$, are connected to said arm which are moved on the pivot $g^3$ when said arm is released by the attraction of the armature of the tripping-magnet $g$. The detent $g^4$ normally engages a double-cam-disk $g^6$ secured to a shaft $g^7$ bearing a pinion $g^8$ which engages a toothed-gear $g^9$ secured to a shaft $g^{10}$ which engages a pinion $g^{12}$ secured to the shaft $o$. Movement of the detent $g^4$ by pressure of the tooth of the cam-disk thereon, releases said disk $g^6$ and permits revolution thereof, and thereby operates to release the shaft $o$, permitting revolution thereof. The disk $g^6$ is provided with two engaging teeth arranged at opposite sides of its axis, adapted to be successively engaged by the detent $g^4$; and also with two pins $g^{13}$ extended laterally from it at opposite sides of its axis, arranged to engage the detent $g^5$ as the disk revolves and to move said detent while passing by it to restore the detent $g^4$ and arm $g^2$.

As the disk $g^6$ has two engaging teeth and two pins arranged at opposite sides of its axis, as shown, it will be seen that it will make but a half revolution whenever released. This movement however is sufficient to turn the shaft $o$ a half revolution and operate the controlling-switches. The power is applied to the shaft $g^{10}$, and, as here shown, said shaft has secured to it two sprocket-wheels $g^{15}$, see Figs. 2 and 3, over which pass power-driven sprocket-chains $g^{16}$, although any other number of chains $g^{16}$ may be employed. The shaft $o$ having thus been turned its first half revolution it is designed to permit it to remain in such position while the signal is being received, and to be then turned its last half revolution and thereby restored to normal, and to accomplish this result the actuating-mechanism of said shaft $o$ is a second time operated after the signal has been received. The actuating-mechanism is a second time released by the tripping-maget $g$ at the proper time to restore the shaft $o$, and to operate said tripping-magnet at such time suitable means are provided for operating the circuit of said magnet and suitable timing-mechanism provided for said means. The tripping-magnet $g$ at such time becomes the restoring-magnet. In order that the tripping-magnet may be thus employed, it is temporarily switched into a restoring-circuit, and is operated when said restoring-circuit is closed by a circuit-operating-device provided for the purpose, and said circuit-operating-device is controlled by the timing-mechanism so as to operate after the active-relay has ceased operating for a predetermined period of time.

Referring to Fig. 23, a branch circuit-wire $r$ is arranged to be connected with that portion of the circuit-wire $a^{18}$ which includes the magnet $g$, and said circuit-wire $r$ is also arranged to be connected by a branch circuit-wire $r'$ with the battery-wire $a^9$. A switch is arranged in the branch-circuit-wire $a^{18}$ composed of a movable switch-lever $r^2$ and two contact-pens $r^3$, $r^4$, arranged at opposite sides of said switch-lever and said switch-lever is adapted to engage one or the other contact-pen. When in engagement with the contact-pen $r^4$ the circuit-wire $a^{18}$ is closed and the tripping-magnet $g$ is included in the tripping-magnet-circuit, and when in engagement with the contact-pen $r^3$ said circuit-wire $a^{18}$ is open at $r^2$, $r^4$, and the restoring-circuit, including the branch-circuit-wire $r$ and tripping-magnet $g$ is closed at $r^2$, $r^3$. The restoring-circuit however is not closed by such operation as it includes a pair of normally separated contact-pens $r^5$, $r^6$, which constitute the circuit-operating-device for the restoring-circuit. The restoring-circuit is as follows:—the circuit-wires $a^9$, $r'$, $r^5$, $r^6$, $r$, $r^3$, $r^2$, magnet $g$, circuit-wires $a^{20}$, $a^{21}$, $a^{11}$, $a^{12}$.

As soon as the tripping-magnet is operated it first releases the actuating-mechanism and turns the shaft $o$ its first half revolution, it is switched into the restoring-circuit in order to be soon after employed as the restoring-magnet, and to accomplish this result the switch-lever $r^2$ is moved out of engagement with the contact-pen $r^4$ to and into engagement with the contact-pen $r^3$. Said switch-lever is moved by an actuating-lever $r^7$, pivoted at $r^8$, having a yoke $r^9$ which embraces an eccentric $r^{10}$ on the shaft $o$, and is moved on its pivot by said shaft $o$. Said actuating-lever has a pin $r^{12}$ extended laterally from it, which occupies a position at one side of said switch-lever $r^2$ and normally holds said switch-lever in engagement with the contact-pen $r^4$, but when moved on its pivot permits said switch-lever to be moved out of engagement with said contact-pen to open the circuit at $r^2$, $r^4$. A sector $r^{13}$ is arranged on said pivot $r^8$ having a pin $r^{14}$ extended laterally from it which occupies a position at the opposite side of said switch-lever, and when said sector is moved in one direction said pin engages said switch-lever and moves it into engagement with the contact-pen $r^3$.

The sector engages a pinion $r^{15}$ secured to a shaft bearing a ratchet-wheel $r^{16}$, which is engaged by a pawl $r^{17}$, borne by an escape-wheel $r^{18}$, so that movement of the sector in one direction is retarded, as for instance in the direction to move the switch-lever into engagement with the contact-pen $r^3$, but is permitted to resume its normal position quickly. The sector is connected with the actuating-lever $r^7$ by a spring $r^{19}$ whereby it is moved by said lever. Thus, as soon as the tripping-magnet has operated to release the operating-mechanism and rotate the shaft $o$ its first half revolution, said actuating-lever $r^7$ is moved by said shaft and the switch-lever disengaged from the contact-pen $r^4$, and the sector is then moved slowly and soon moves the switch-lever into engagement with the contact-pen $r^3$. The restoring-circuit having been closed at $r^2$, $r^3$, the tripping-magnet $g$ is then included in the restoring-circuit ready to respond to a closure thereof to again release the actuating-mechanism and rotate the shaft $o$ its second half revolution. The restoring-circuit is closed for the purpose of thus operating the tripping-magnet a second time by the contact-pens $r^5$, $r^6$, which are closed by means of timing-mechanism at the end of a predetermined period of time after the last signal-impulse has been received.

The timing-mechanism is driven by power, and, preferably, the same power-driven sprocket-chains $g^{16}$ are employed to operate it. As here shown said sprocket-chains each extend over idlers $g^{17}$, and are formed at their lower ends into two loops $g^{18}$, $g^{19}$, and the portion between said loops passes over a sprocket-wheel $g^{20}$. A pulley $g^{21}$ is suspended by the loop $g^{18}$ to which is attached a weight $g^{22}$ which is connected by a cord $g^{23}$, with a pulley $g^{24}$ suspended by the other loop. A shaft $g^{25}$ supports the sprocket-wheels $g^{20}$ and has secured to it a bevel-gear $g^{26}$ engaged by a bevel-gear $g^{27}$ secured to a winding-shaft $g^{28}$. As said winding-shaft is turned in one direction by a suitable winding-device the sprocket-wheel $g^{20}$ will be revolved in one direction and the weight will be lifted, the loop $g^{18}$ shortening and the loop $g^{19}$ lengthening, so that the sprocket-wheels $g^{15}$ remain at rest. And when weight is permitted to fall all the sprocket-wheels will be rotated by the chains.

The actuating-mechanism herein shown may be wound by means herein shown while in operation, if desired. Furthermore but a single winding-device is provided for both the actuating-mechanism and timing-mechanism, which simplifies the construction as well as the operation of winding said mechanisms. In lieu of this form of driving-mechanism any other suitable form may be employed.

The timing-mechanism, see Figs. 14 to 18, consists of a pinion $g^{35}$, secured to the sprocket-wheel-shaft $g^{25}$, which engages a toothed-gear $g^{36}$, mounted loosely on a shaft $g^{37}$, and bearing a pawl $g^{38}$, which engages a ratchet-wheel $g^{39}$, secured to said shaft $g^{37}$, and a toothed-gear $g^{40}$ secured to said shaft $g^{37}$ engages a pinion $g^{41}$ secured to a shaft bearing a toothed-gear $g^{42}$ which engages a pinion $g^{43}$, secured to a shaft bearing a toothed-gear $g^{44}$ which engages a pinion $g^{45}$ secured to a shaft bearing an escape-wheel $g^{46}$. The shaft bearing the escape-wheel also bears a worm $g^{50}$, which is adapted to be engaged and disengaged by an arm $g^{51}$, universally pivoted at $g^{52}$, whereby it is adapted to be moved into and out of engagement with the worm and also from end to end of the worm. The arm $g^{51}$, is held pressed into engagement with the worm by a spring, and is also moved by said spring when disengaged from the worm to the opposite end of the worm in order that it may be again moved along by the worm to its starting-point. Movement of said arm $g^{51}$ is controlled by a timing-magnet $n$, the armature $n'$ of which is pivoted at $n^2$, and has connected with it an arm $n^3$ bearing a detent which is adapted to engage the arm $g^{51}$. The armature of said timing-magnet is normally retracted, and when attracted the arm is moved out of engagement with the worm and is moved to the opposite end of the worm by the spring, and as the armature of the timing-magnet repeatedly responds to the vibrations of the main-relay, the arm $g^{51}$ is repeatedly set back, until finally when the main-relay ceases to operate said arm is moved by the worm to its starting-point and during such movement passes beneath the contact-pens $r^6$, $r^5$, and closes them and subsequently permits them to open, thereby momentarily closing the restoring-circuit.

The timing-magnet $n$ is included in a circuit $a^0$, $a^{27}$, $a^{29}$, $a^{30}$, $a^{80}$, $a^{21}$, $a^{11}$, $a^{12}$, hence is operated upon each vibration of any one of the main-relays.

Whenever the repeating-circuit of the active-relay is closed and the repeating-circuits of the inactive relays opened, so that the repeating-circuit is placed exclusively under the control of the active-relay and is being operated by said active-relay, it is desirable that the annunciator $i$ of the active-relay shall be operated automatically to indicate that a signal is being received, and also the particular main-relay and main-circuit which is being operated. To effect the operation of the annunciator $i$ the annunciator-circuit $a^0$, $a^{13}$, $a^{14}$, $a^{15}$, $a^{24}$, $a^{25}$, $a^{26}$, $a^{20}$, $a^{21}$, $a^{11}$, $a^{12}$, which is normally open, is closed by a controlling-switch, which is operated simultaneously with the controlling-switch $p$ for the repeating-circuit. Said controlling-switch, as here shown, consists of an operating-lever $p^8$, arranged on the pivot-shaft $p'$, and having at its extremity contacts $p^9$, which engage stationary contacts $p^{10}$ to close the circuit. A cam $p^{12}$ is arranged beneath said lever, which is employed for raising it to close the annunciator-circuit, and said cam is secured to the rock-shaft $p^6$, so as to be moved by said shaft and to be controlled by the means employed for controlling the operation of said shaft. Said cam normally occupies a position out of engagement with the lever $p^8$, see Fig. 2, and when the shaft $p^6$ is rocked in one direction, as for instance, toward the right, Fig. 5, said cam will be moved to engage and lift the lever $p^8$ and close the annunciator-circuit. The annunciator-circuit will remain closed at such point while the signal is being received. While the cam $p^{12}$, under the action of the active-relay is thus operated, the corresponding cams of the inactive-relays will be moved in the opposite ways by the rock-shafts $p^6$, which are rocked in the opposite ways, and the operating-levers $p^8$ will remain in their lowermost positions and the annunciator-circuits will remain open at such corresponding points.

The several annunciators are arranged in multiple and in series with their controlling-switches.

Whenever the repeating-circuit is placed exclusively under the control of an active-relay, and the annunciator-circuit of the annunciator $i$ is adapted to be operated by said active-relay, it is desirable that the annunciators $a^{62}$ of the inactive-relays shall be in condition to operate, if any one of said inactive-relays should become active, that is to say, if a signal from another main-circuit should operate one of the inactive-relays while an active-relay is operating. To effect the operation of the annunciators $a^{62}$, the annunciator-circuit $a^0$, $a^{13}$, $a^{14}$, $a^{61}$, $a^{11}$, $a^{12}$, which is normally open, is closed by controlling-switches, which are operated simultaneously with the controlling-switches $p$ and $p^8$. Said controlling-switches, as here shown, consist of operating-levers $p^{15}$, arranged on the pivot-shafts $p'$, and having at their extremities contacts $p^{16}$, which engage stationary contacts $p^{17}$ to close the circuit. Cams $p^{18}$ are arranged beneath the levers $p^{15}$, which are employed for raising them to cause the contacts to close the annunciator-circuit, and said cams are secured to the rock-shafts $p^6$, so as to be moved by said shafts and to be controlled by the means employed for controlling the operation of said shafts. Said cams normally occupy a position out of engagement with the levers $p^{15}$, but when the shafts $p^6$ are rocked in one direction, as for instance, toward the left, as they will be when the operating-members $a^{43}$ of the inactive-relays are moved, as shown in Fig. 6, said cams will be moved to engage and lift the levers $p^{15}$ and close the annunciator-circuit. The annunciator-circuit will remain closed at such point while a signal is being received, so that the annunciators $a^{62}$ are in condition to be operated by the retracting-armatures of any one of the inactive-relays.

The several annunciators $a^{62}$ are arranged in multiple and in series with their controlling-switches.

In case two signals are received at the same time on two separate main-relays, that is to say, the first impulses of both signals are received simultaneously, means are provided for opening the repeating-circuit, so that neither signal is automatically repeated, although both signals are recorded, and the attendant can make his selection as to which one of the signals he will first transmit to the engine-houses and elsewhere. As a means for opening the repeating-circuit in such event the controlling-device $j$ is employed, and said device comprises an operating-magnet $j'$ which is included in the annunciator-circuit, and a circuit-breaker $j^2$, $j^3$, which is included in the repeating-circuit. The armature of said operating-magnet is normally retracted, and whenever the annunciator-circuit is closed said operating-magnet is energized, but the retractile-spring of the armature is sufficiently strong to still hold the armature in its retracted position.

In case the annunciator-circuit is closed at two or more different points, as it will be when two signals are received simultaneously on two or more different main-relays and two or more annunciators $i$ are included therein, by reason of said annunciators $i$ being arranged in multiple the resistance of the annunciator-circuit is reduced, and as a result the current passing over the circuit is increased and the operating-magnet more strongly energized, so that the armature of said magnet overcomes its strong retractile-spring and is attracted. The attraction of the armature acts to operate the circuit-breaker $j^2$, $j^3$, to open the repeating-circuit.

As here shown, see Figs. 11 and 12, the circuit-operating-member $j^2$ consists of a contact-pen normally bearing with a yielding pressure on the circuit-operating-member $j^3$, and said member $j^3$ consists of an arm pivoted at $j^4$ and adapted to be moved into abnormal position by a spring $j^5$ and to be held in normal position by a latch $j^6$ which is formed as an extension on the armature of the operating-magnet. Whenever the operating-magnet is sufficiently energized to attract its armature the member $j^3$ is released and is moved into its abnormal position by means of a spring connected therewith, and disengages the contact-pen $j^2$ and opens the repeating-circuit. The member $j^3$ is provided with a heel-extension $j^7$, which is adapted to be engaged by a suitable cam $j^8$ adapted to be turned by a manually-operated crank-arm $j^9$ for the purpose of restoring the member $j^3$ to its normal position.

A buzzer $j^{10}$ is employed for indicating when the controlling-device $j$ is operated, and, as here shown, the buzzer-circuit $j^{12}$ is closed by a circuit-closer $j^{13}$, arranged to be operated by the circuit-breaking-member $j^3$.

In case an accident happens to the automatic repeating-mechanism or any part thereof, and it is necessary to remove the same from the control of the main-relays, or if, for any reason it should not be desired to employ the automatic repeating-mechanism, or if, for any reason it should be desired to disconnect the automatic repeating-mechanism from any one of the main-relays, means are provided whereby these results may be accomplished, and, in either case, the main-relays from which the repeating-mechanism is disconnected will still operate the recording-circuits, and the circuit for the universal recording-instrument, and also the circuit for the annunciator $a^{62}$. To provide for accomplishing these results a switch $a^{60}$ is arranged between the circuit-wires $a^{29}$, $a^{30}$, which, when in one position includes the timing-magnet $n$, and when in the other position excludes the same, and said switch is connected with the switch $a^{14}$ by an insulated bar so that when moved said switch $a^{14}$ is moved with it and the tripping-magnet $g$ of the repeating-mechanism, by which the controlling-switches $p$ and $p^8$ are operated, and also the controlling-device $j$, are disconnected so that the repeating-mechanism is entirely excluded, and also the automatic annunciators $i$, and said switch $a^{14}$, when thus moved connects the circuit-wire $a^{13}$ with a circuit-wire $a^{61}$, which includes the annunciator $a^{62}$, and also a circuit-breaker $a^{63}$, adapted to be operated by said annunciator $a^{62}$, for breaking the circuit of said annunciator when the latter is operated.

A switch, as $a^{60}$, is provided for each main-relay, so that each main-relay may be separately disconnected from the automatic repeating-mechanism, leaving the other main-relays connected therewith. While any one of the switches $a^{60}$ and the switch $a^{14}$ connected with it are thus moved, should the main-relay corresponding to said switches operate, the recording-circuit will be operated, and the circuit of the universal recording-instrument and also the annunciator-circuit $a^9$, $a^{13}$, $a^{61}$, $a^{12}$.

All the switches $a^{60}$ and the switches $a^{14}$ connected with them may be thrown if desired, in which case the automatic repeating-mechanism is disconnected from all the main-relays, yet all said relays are in operative condition to receive the signals and operate their recording-circuits and also the circuit of the universal recording-instrument, and also the aforesaid annunciator-circuit to operate the annunciators $a^{62}$.

In case an accident should happen to the main-relays or any one of them, or to the controlling-devices operated by them, which control the automatic repeating-mechanism, whereby any one or all of the main-relays will not operate to automatically effect the repeating of the signal, or if for any other reason it should be desired to exclude said elements, and yet repeat the signal which is received from any one of the main-circuits, means are herein provided by which any one of the main-circuits may be directly connected with means for operating the repeating-transmitter. The hand switches 4—4 are here shown as employed for accomplishing this result, they both being arranged in series in the main-circuit-wire 2. Said switches, when moved, are arranged to engage contacts 5—5, respectively connected with circuit-wires 6—6, which include an operating-magnet 7 for the repeating-transmitter. The main-circuits are normally charged and when the switches 4—4 of any main-circuit is thrown onto the contacts 5—5, said operating-magnet 7 is connected directly into the main circuit and is adapted to be operated thereby. In such case if the relays are still included in the main-circuits they also will be operated, and the recording-circuits will be operated and also the circuit of the universal recording-instrument $k$, and if the switches $a^{60}$, $a^{14}$, are also moved to the left the annunciator-circuit, including the annunciators $a^{62}$, also will be operated. Said main-relays however, may be cut out, if desired, by the hand switches 3—3, and, in such case, the changes in the condition of the main-circuits will simply effect the repeating-transmitter.

In case any one of the switches 4 is moved to directly connect the repeating-transmitter directly with any one of the main-circuits, it is desirable that all the remaining switches 4 shall remain in their normal positions, for if a signal should be coming in over a main-circuit which is connected directly with the repeating-transmitter and another switch should be moved at such time the signal would be mutilated and might be lost. To effect this result interlocking-mechanism is provided for the several switches 4, so constructed and arranged that in case any one of the switches is moved all the remaining switches will be prevented from movement. Such interlocking-mechanism is shown in Figs. 19, 20 and 21, wherein it will be seen that $t$ represents the bar connecting the pair of switch-arms, $t'$ a plate loosely connected with said bar attached to a pivot-pin $t^2$ and preferably bearing an indicator, said pivot-pin $t^2$ extending through the board, and adapted to be turned by the bar as the switch-arms are moved. A detent $t^3$ is attached to the inner end of the pivot-pin $t^2$ which is moved by it.

$t^4$ represents a rock-shaft extending across the board having secured to it a plurality of fingers $t^5$, one for each pair of switch-arms 4, and said fingers extend upward and have curved ends adapted to be engaged by the detents $t^3$ when the latter are moved to thereby in turn move the fingers and rock the shaft. Said fingers also have heel extensions $t^6$, which, when the fingers are moved are adapted to occupy positions in front of the detents $t^3$ to prevent movement thereof. Therefore, when any pair of switch-arms 4 is moved its plate $t'$ will be correspondingly moved and a finger $t^5$ will be moved to rock the shaft $t^4$, and all the remaining fingers will be likewise moved by said shaft and brought into position to prevent movement of all the remaining detents $t^3$ and switch-arms connected therewith.

Hand-switches $f$ are employed to open the recording-circuits of the several main-relays respectively whenever desired. Hand-switches 10 are employed for disconnecting the battery-wire $a^9$ from any one of the circuit-operating-devices of the main-relays. Hand-switches 12 are employed for disconnecting the universal recording-instrument from any one of the main-relays whenever desired and also for disconnecting the timing-magnet $n$.

In case the armature of the tripping-magnet $g$ should be accidentally moved and the arm $g^2$ released, the shaft $o$ would be turned and the controlling-switches for the repeating-circuit opened, and should a signal be received with the parts in such position it would not be automatically repeated. This difficulty, however, may be overcome by starting the timing-mechanism which acts to restore the parts, so that in case of such accidental movement of the armature of the magnet $g$, the parts, although moved, will be immediately restored.

$a^{75}$ represents a circuit-operating-device which is provided for closing another circuit for the timing-magnet $n$, said circuit comprising the circuit-wires $a^{76}$, $a^{77}$. Said circuit-operating-device $a^{75}$ is adapted to be automatically closed by a cam $a^{78}$, secured to the shaft $g^7$ of the actuating-mechanism of the shaft $o$, and during each time the shaft $g^7$ is released and the actuating-mechanism permitted to operate the shaft $o$, for its first half revolution, said cam is operated to momentarily close said circuit-operating-device $a^{75}$, leaving said device open at the end of the operation. The timing-magnet, when thus operated, operates to close the restoring-circuit and thereby cause the tripping-magnet $g$ to again operate the actuating-mechanism and restore the parts. During the second operation of said actuating-mechanism the circuit-operating-device $a^{75}$ remains open.

Having thus described my invention what I claim as new and desire to secure by Letters Patent is:—

1. The combination of a plurality of main circuits, a plurality of main-relays controlled thereby, a repeating-circuit, a plurality of circuit-operating-devices for said repeating-circuit operated by said main-relays, respectively, a plurality of switches controlling the operation of said repeating-circuit, and means, operated by any one of said relays, when active, for holding the switch of the active-relay closed and for opening the remaining switches, substantially as described.

2. The combination of a plurality of main circuits, a plurality of main-relays controlled thereby, a repeating-circuit, a plurality of circuit-operating-devices for said repeating-circuit operated by said main-relays, respectively, a plurality of normally closed switches controlling the operation of said repeating-circuit, and means, operated by any one of said main-relays, when active, for locking the switch of said active-relay in closed position and for opening all the remaining switches, and for holding all said remaining switches in such positions while a signal is being received by said active-relay, substantially as described.

3. The combination of a plurality of main circuits, a plurality of main-relays controlled thereby, a repeating-circuit, a plurality of circuit-operating-devices for said repeating-circuit operated by said main-relays, respectively, a plurality of switches controlling the operation of said repeating-circuit, and means, operated by any one of said relays, when active, for holding the switch of the active-relay closed and for opening the remaining switches and for holding all said remaining switches in such positions while a signal is being received and for subsequently restoring them to normal, substantially as described.

4. The combination of a plurality of main circuits, a plurality of main relays controlled thereby, a repeating-circuit, a plurality of circuit-operating-devices for said repeating-circuit, operated by said main-relays, respectively, a plurality of switches controlling the operation of said repeating-circuit, an operating-device for each switch, movement of which permits or prevents the operation of the switch, separate controlling-devices for said operating-devices under the control of the several main relays, for determining the operation of said operating-devices, and an actuating-mechanism for all said operating-devices, adapted to be operated by any one of the main relays, substantially as described.

5. The combination of a plurality of main circuits, a plurality of main relays controlled thereby, a repeating-circuit, a plurality of circuit-operating-devices for said repeating-circuit operated by said main-relays, respectively, a plurality of switches controlling the operation of said repeating-circuit, an operating-device for each switch, movement of which permits or prevents the operation of the switch, separate controlling-devices for said operating-devices under the control of the several main relays, for determining the operation of said operating-devices, a normally wound actuating-mechanism for all said operating-devices, and means for releasing said actuating-mechanism controlled by any one of said main relays, substantially as described.

6. The combination of a plurality of main circuits, a plurality of main-relays controlled thereby, a repeating-circuit, a plurality of circuit-operating-devices for said repeating-circuit, operated by said main-relays, respectively, a plurality of switches controlling the operation of said repeating-circuit, an operating-device for each switch, movement of which permits or prevents the operation of the switch, separate controlling-devices for said operating-devices under the control of the several main-relays, a normally wound actuating-mechanism for all said operating-devices, means for releasing said actuating-mechanism controlled by any one of said main-relays, and time-controlled means for subsequently again releasing said actuating-mechanism to restore the operating-devices, substantially as described.

7. The combination of a plurality of main circuits, a plurality of main-relays controlled thereby, a repeating-circuit, a plurality of circuit-operating-devices for said repeating-circuit, operated by said main-relays, respectively, a plurality of switches controlling the operation of said repeating-circuit, an operating-device for each switch, movement of which permits or prevents the operation of the switch, separate controlling-devices for said operating-devices under the control of the several main-relays, a normally wound actuating-mechanism for said operating-devices, a tripping-magnet for said actuating-mechanism, the circuit of which is common to all said main-relays, means for removing the tripping-magnet from the control of the main-relays and for placing it under the control of a restoring-circuit, a circuit-operating-device for said restoring-circuit, and timing-mechanism controlled by all said main-relays for operating said circuit-operating-device, substantially as described.

8. The combination of a plurality of main circuits, a plurality of main-relays controlled thereby, a repeating-circuit, a plurality of circuit-operating-devices for said repeating-circuit, operated by said main-relays, respectively, a plurality of switches controlling the operation of said repeating-circuit, an operating-device for each switch, movement of which permits or prevents the operation of the switch, separate controlling-devices for said operating-devices under the control of the several main-relays, a normally wound actuating-mechanism for said operating-devices, a tripping-magnet for said actuating-mechanism, the circuit of which is common to all said main-relays, time-controlled means for removing the tripping-magnet from the control of the main-relays and for placing it under the control of a restoring-circuit, a circuit-operating-device for said restoring-circuit, and timing-mechanism controlled by all said main-relays for operating said circuit-operating device, substantially as described.

9. The combination of a plurality of main circuits, a plurality of main-relays controlled thereby, a repeating-circuit, a plurality of circuit-operating-devices for said repeating-circuit, operated by said main-relays, respectively, a plurality of switches controlling the operation of said repeating-circuit, an operating-device for each switch, movement of which permits or prevents the operation of the switch, separate controlling-devices for said operating-devices under the control of the several main-relays, a normally wound actuating-mechanism for said operating-devices, a tripping-magnet for said actuating-mechanism, the circuit of which is common to all said main-relays, time-controlled means for removing the tripping-magnet from the control of the main-relays and for placing it under the control of a restoring-circuit, a circuit-operating-device for said restoring-circuit, and timing-mechanism controlled by all said main-relays for operating said circuit-operating-device, and means for winding said actuating-mechanism and timing-mechanism simultaneously, substantially as described.

10. The combination of a plurality of main circuits, a plurality of main-relays controlled thereby, a repeating-circuit, a plurality of circuit-operating-devices for said repeating-circuit, operated by said main-relays, respectively, a plurality of switches controlling the operation of said repeating-circuit, an operating-device for each switch, movement of which permits or prevents the operation of the switch, separate controlling-devices for said operating-devices under the control of the several main-relays, a normally wound actuating-mechanism for said operating-devices, a tripping-magnet for said actuating-mechanism, the circuit of which is common to all said main-relays, time-controlled means for removing the tripping-magnet from the control of the main-relays and for placing it under the control of a restoring-circuit, a circuit-operating-device for said restoring-circuit, and timing-mechanism controlled by all said main-relays for operating said circuit-operating-device, a weight, and means connecting it with both said actuating-mechanism and said timing-mechanism for propelling the same, substantially as described.

11. The combination of a plurality of main circuits, a plurality of main-relays controlled thereby, a repeating-circuit, a plurality of circuit-operating-devices for said repeating-circuit, operated by said main-relays, respectively, a plurality of switches controlling the operation of said repeating-circuit, an operating-device for each switch, movement of which permits or prevents the operation of the switch, separate controlling-devices for said operating-devices under the control of the several main-relays, a normally wound actuating-mechanism for said operating-devices, a tripping-magnet for said actuating-mechanism, the circuit of which is common to all said main-relays, time-controlled means for removing the tripping-magnet from the control of the main-relays and for placing it under the control of a restoring-circuit, a circuit-operating-device for said restoring-circuit, and timing-mechanism controlled by all said main-relays for operating said circuit-operating-device, a weight, and sprocket-chains connecting it with both said actuating-mechanism and said timing-mechanism for propelling them both, substantially as described.

12. The combination of a plurality of main circuits, a plurality of main-relays controlled thereby, a repeating-circuit, a plurality of circuit-operating-devices for said repeating-circuit operated by said main-relays, respectively, a plurality of switches controlling the operation of said repeating-circuit, an operating-device for each switch, movement of which permits or prevents the operation of said switch, a pair of controlling-detents for each operating-device, for determining its operation, means operated by the armature of any one of the main-relays for controlling the positions of all said controlling-detents, and means controlled by any one of the main-relays for actuating all said operating-devices, substantially as described.

13. The combination of a plurality of main circuits, a plurality of main-relays controlled thereby, a repeating-circuit, a plurality of circuit-operating-devices for said repeating-circuit operated by said main-relays, respectively, a plurality of switches controlling the operation of said repeating-circuit, an operating-device for each switch, movable in one direction to hold the switch closed and in the opposite direction to permit it to open, means controlled by any one of the main-relays for determining the direction of movement of all the operating-devices and means also controlled by any one of said main-relays for moving all said operating-devices, substantially as described.

14. The combination of a plurality of main circuits, a plurality of main-relays controlled thereby, a repeating-circuit, a plurality of circuit-operating-devices for said repeating-circuit operated by said main-relays, respectively, a plurality of switches controlling the operation of said repeating-circuit, an operating-device for each switch, movement of which permits or prevents operation of said switch, a controlling-device for each operating-device, a movable-member operated by each main-relay for governing the operation of said controlling-device, and means controlled by any one of the main-relays for actuating all said operating-devices, substantially as described.

15. The combination of a plurality of main circuits, a plurality of main-relays controlled thereby having armatures free to move at all times and bearing two sets of contacts, one set controlling the recording-circuits and the other set controlling the repeating-circuit, and also bearing an independently movable member, a recorder in said recording-circuit, a repeating-transmitter in said repeating-circuit, and automatic means, controlled by the independently movable-member on any one of the armatures of said main-relays, which is active, for permitting operation of the repeating-transmitter by said active-relay and for preventing the operation of said repeating-transmitter by all the inactive-relays, whereby interfering signals are recorded but only one of said signals is repeated, substantially as described.

16. The combination of a plurality of main circuits, a plurality of main-relays controlled thereby, a plurality of recording-devices controlled by said main-relays, respectively, a repeating-circuit, a plurality of circuit-operating-devices for said repeating-circuit operated by said main-relays, respectively, a plurality of switches controlling the operation of said repeating-circuit, and means, operated by any one of said relays, when active, for holding the switch of said active-relay closed and the remaining switches open while a signal is being received, substantially as described.

17. The combination of a plurality of main circuits, main-relays controlled thereby, respectively, a repeating-transmitter, a repeating-circuit therefor, common to all said main-relays and adapted to be operated thereby, a plurality of recording-devices, recording-circuits therefor, adapted to be operated by said main-relays, respectively, non-interference-mechanism adapted to be operated by any one of said main-relays for controlling the operation of said repeating-circuit, and members for controlling the operation of said non-interference-mechanism, adapted to be moved by the armatures of the main-relays, which permit independent movement of said armatures, substantially as described.

18. The combination of a plurality of main circuits, main-relays controlled thereby, respectively, a repeating-transmitter, a repeating-circuit therefor, common to all said main-relays and adapted to be operated thereby, a plurality of recording-devices, recording-circuits therefor, adapted to be operated by said main-relays, respectively, non-interference mechanism adapted to be operated by any one of said main-relays for controlling the operation of the repeating-circuit, and members for controlling the operation of the non-interference-mechanism, pivotally supported upon the armatures of the main-relays and movable by said armatures, but which permit independent movement of said armatures, substantially as described.

19. The combination of a plurality of main circuits, main-relays controlled thereby, respectively, a repeating-transmitter, a repeating-circuit therefor, common to all said main-relays and adapted to be operated thereby, a plurality of recording-devices, recording-circuits therefor, adapted to be operated by said main-relays, non-interference-mechanism adapted to be operated by any one of the main-relays for controlling the operation of the repeating-circuit, a plurality of switches controlling the operation of the repeating-circuit, an operating-device for each switch, movement of which permits or prevents the operation of said switch, controlling-devices for said operating-devices, members for governing the operation of said controlling-devices, moved by the armatures of the main-relays, which permit independent movement of said armatures, and means controlled by any one of the main-relays for actuating all said operating-devices, substantially as described.

20. The combination of a plurality of main circuits, a plurality of main-relays controlled thereby, a plurality of recording-devices controlled by said main-relays, respectively, a repeating-transmitter adapted to be operated by all said main-relays, movable members adapted to be operated by the armatures of said main-relays, which permit independent movement of said armatures and which control the operation of the repeating-circuit, means for locking any one of said movable-members with the repeating-circuit in operative condition and for holding it locked while a signal is being repeated and for permitting movement of the remaining movable members, substantially as described.

21. The combination of a plurality of main circuits, main-relays controlled thereby, a repeating-transmitter common to all said main-relays and controlled thereby, non-interference-mechanism adapted to be operated by any one of said main-relays for controlling the operation of the circuit of the repeating-transmitter, two-annunciator-circuits, and means for placing one of said annunciator-circuits under the control of one of the main-relays and the other under the control of all the remaining relays, substantially as described.

22. The combination of a plurality of main circuits, main-relays controlled thereby, a repeating-transmitter common to all said main relays and controlled thereby, non-interference-mechanism adapted to be operated by any one of said main-relays, for controlling the operation of the circuit of the repeating-transmitter, but which permits freedom of motion at all times of the armatures of all the main-relays, and two annunciator-circuits, one adapted to be operated by the armature of one of the main-relays, and the other by the armatures of the remaining relays, substantially as described.

23. The combination of a plurality of main circuits, main-relays controlled thereby, a repeating-transmitter common to all said main-relays and controlled thereby, non-interference-mechanism adapted to be operated by any one of said main-relays for controlling the operation of the circuit of the repeating-transmitter, two annunciator-circuits, each containing separate annunciators for the several main-relays and means for placing one of said annunciator-circuits under the control of any one of the main-relays and the other under the control of all the remaining relays, substantially as described.

24. The combination of a plurality of main circuits, main-relays controlled thereby, a repeating-transmitter common to all said main-relays and controlled thereby, non-interference-mechanism adapted to be operated by any one of said main-relays for controlling the operation of the circuit of the repeating-transmitter, and two annunciator-circuits controlled by said non-interference-mechanism and operated by said main-relays, each containing separate annunciators, corresponding to the several main-relays, substantially as described.

25. The combination of a plurality of main circuits, main-relays controlled thereby, respectively, a repeating-transmitter common to all said main-relays and controlled thereby, non-interference-mechanism adapted to be operated by any one of the main-relays for placing the circuit of the repeating-transmitter under the exclusive control of the main-relay which operates it, two annunciator-circuits adapted to be operated by said main-relays and means operated by said non-interference-mechanism for placing one of said annunciator-circuits under the exclusive control of the active-relay and the other annunciator-circuit under the control of all the remaining relays, and a plurality of annunciators contained in each annunciator-circuit, substantially as described.

26. The combination of a plurality of main circuits, main-relays controlled thereby, respectively, a repeating-transmitter, common to all said main-relays and controlled thereby, non-interference-mechanism adapted to be operated by any one of the main-relays for controlling the operation of the circuit of the repeating-transmitter, two annunciator-circuits adapted to be operated by said main-relays, means operated by any one of the main-relays for placing one of said annunciator-circuits under the exclusive control of the active-relay and the other annunciator-circuit under the control of all the remaining relays, and a plurality of annunciators contained in each annunciator-circuit, substantially as described.

27. The combination of a plurality of main circuits, main-relays controlled thereby, respectively, a repeating-transmitter common to all said main-relays and controlled thereby, non-interference-mechanism adapted to be operated by any one of the main-relays for controlling the operation of the circuit of the repeating-transmitter, two annunciator-circuits adapted to be operated by said main-relays, controlling-switches for said circuits, members, operated by the non-interference-mechanism for controlling the operation of said controlling-switches, and a plurality of annunciators contained in each annunciator-circuit, substantially as described.

28. The combination of a plurality of main circuits, main-relays controlled thereby, respectively, a repeating-transmitter, common to all said main-relays and controlled thereby, non-interference-mechanism adapted to be operated by any one of the main-relays for controlling the operation of the circuit of the repeating-transmitter, two normally open annunciator-circuits adapted to be operated by said main-relays, controlling-switches for said circuits, means operated by the non-interference-mechanism for moving the controlling-switches to close one of the annunciator-circuits in connection with an active-relay and to close the other annunciator-circuit in connection with all the remaining-relays, substantially as described.

29. The combination of a plurality of main circuits, main-relays controlled thereby, a repeating-transmitter common to all said main-relays and controlled thereby, a plurality of recording-devices controlled by said main-relays, non-interference-mechanism adapted to be operated by any one of said main-relays for controlling the operation of the circuit of the repeating-transmitter, two-annunciator-circuits and means for placing one of said annunciator-circuits under the control of any one of the main-relays and the other under the control of all the remaining relays, substantially as described.

30. The combination of a plurality of main circuits, main-relays controlled thereby, a repeating-transmitter common to all said main-relays and controlled thereby, a plurality of recording-devices controlled by said main-relays, non-interference-mechanism adapted to be operated by any one of said main-relays for controlling the operation of the circuit of the repeating-transmitter, two annunciator-circuits and means for placing one of said annunciator-circuits under the control of any one of the main-relays and the other under the control of all the remaining relays, and a plurality of annunciators contained in each annunciator-circuit, substantially as described.

31. The combination of a plurality of main circuits, main-relays controlled thereby, respectively, a repeating-transmitter, common to all said main-relays and controlled thereby, and automatic means for opening the circuit of said repeating-transmitter, adapted to be operated by any two or more main-relays responding to their first signal-impulses simultaneously, substantially as described.

32. The combination of a plurality of main circuits, main-relays controlled thereby, respectively, a repeating-transmitter, common to all said main-relays and controlled thereby, a circuit-breaker for the circuit of said repeating-transmitter, mechanism for operating it, adapted to be operated by any two or more main-relays responding to their first signal-impulses simultaneously, substantially as described.

33. The combination of a plurality of main circuits, main-relays controlled thereby, respectively, a repeating-transmitter, common to all said main-relays and controlled thereby, a circuit-breaker for the circuit of said repeating-transmitter, an operating-magnet therefor, a circuit for said magnet containing a plurality of resistances arranged in multiple and adapted to be operated by all said main-relays, and means for holding the armature of said operating-magnet in its retracted position upon a closure of said circuit including any one of the resistances but to permit attraction thereof when any two or more resistances are included therein in multiple, substantially as described.

34. The combination of a plurality of main circuits, main-relays controlled thereby, respectively, a repeating-transmitter, common to all said main-relays and controlled thereby, automatic means for opening the circuit of said repeating-transmitter, adapted to be operated by any two or more main-relays responding to their first signal-impulses simultaneously, and a plurality of recording-devices adapted to be operated by said main-relays respectively, substantially as described.

35. The combination of a plurality of main circuits, main-relays controlled thereby, respectively, a repeating-transmitter common to all said main-relays and controlled thereby, non-interference-mechanism adapted to be operated by any one of said main-relays for controlling the operation of the circuit of the repeating-transmitter, and means for disconnecting said non-interference-mechanism from all said main-relays, substantially as described.

36. The combination of a plurality of main circuits, main-relays controlled thereby, respectively, a repeating-transmitter, common to all said main-relays and controlled thereby, non-interference-mechanism adapted to be operated by any one of the main-relays for controlling the operation of the circuit of the repeating-transmitter and separate means for disconnecting said non-interference-mechanism from each main-relay, substantially as described.

37. The combination of a plurality of main circuits, main-relays controlled thereby, respectively, a repeating-transmitter, common to all said main-relays and controlled thereby, non-interference-mechanism adapted to be operated by any one of the main-relays for controlling the operation of the circuit of the repeating-transmitter, means for disconnecting said non-interference-mechanism from said main-relays, an annunciator-circuit, means for placing it under the control of said main-relay, and a plurality of annunciators contained in said annunciator-circuit, substantially as described.

38. The combination of a plurality of main circuits, main-relays controlled thereby, respectively, a repeating-transmitter common to all said main-relays and controlled thereby, and means for disconnecting said repeating-transmitter from any one of said main-relays and for connecting it with the corresponding main circuit, whereby it may be operated directly thereby, substantially as described.

39. The combination of a plurality of main circuits, main-relays controlled thereby, respectively, a repeating-transmitter having an operating-magnet, common to all said main-relays and adapted to be controlled thereby, and also having an operating-magnet adapted to be controlled by any one of the main circuits, and means for connecting either operating-magnet in operative connection with its controlling means, substantially as described.

40. The combination of a plurality of main circuits, main-relays controlled thereby, respectively, a repeating-transmitter common to all said main-relays and controlled thereby, non-interference-mechanism adapted to be operated by any one of the main-relays for controlling the operation of the circuit of the repeating-transmitter, separate means for disconnecting the non-interference-mechanism from each main-relay and for connecting the repeating-transmitter in circuit with any one of the main circuits, substantially as described.

41. The combination of a plurality of main circuits, main-relays controlled thereby, respectively, a repeating-transmitter common to all said main-relays and controlled thereby, non-interference-mechanism adapted to be operated by any one of the main-relays for controlling the operation of the circuit of the repeating-transmitter, separate switches for disconnecting the non-interference-mechanism from each main-relay and for connecting the repeating-transmitter in circuit with any one of the main-relays and interlocking-mechanism for said switches, permitting individual operation only thereof, substantially as described.

42. The combination of a plurality of main circuits, main-relays controlled thereby, respectively, a repeating-transmitter having an operating-magnet common to all said main-relays, adapted to be controlled thereby, and having another operating-magnet common to all said main circuits and adapted to be controlled thereby, non-interference-mechanism, adapted to be operated by any one of said main-relays for controlling the operation of the circuit of the repeating-transmitter, means for disconnecting the non-interference-mechanism and for placing the operating-magnet of the repeating-transmitter under the control of any one of the main circuits and in series with the main-relay which is connected therewith, substantially as described.

In testimony whereof, I have signed my name to this specification, in the presence of two subscribing witnesses.

NATHAN H. SUREN.

Witnesses:
B. J. Noyes,
H. B. Davis.

---

Copies of this patent may be obtained for five cents each, by addressing the "Commissioner of Patents, Washington, D. C."